United States Patent
Lin et al.

(10) Patent No.: US 8,328,363 B2
(45) Date of Patent: Dec. 11, 2012

(54) OPTICAL SYSTEM FOR PROJECTION DEVICE

(75) Inventors: Ming-Te Lin, Taipei Hsien (TW); Wen-Pin Yeh, Taipei Hsien (TW); Chun-Hsun Wang, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 368 days.

(21) Appl. No.: 12/748,446

(22) Filed: Mar. 28, 2010

(65) Prior Publication Data

US 2011/0188010 A1   Aug. 4, 2011

(30) Foreign Application Priority Data

Feb. 1, 2010  (CN) .......................... 2010 1 0300994

(51) Int. Cl.
   *G03B 21/00*   (2006.01)

(52) U.S. Cl. ................. 353/31; 353/30; 353/33; 353/37; 353/38; 353/94; 353/98; 353/99; 362/227; 362/228

(58) Field of Classification Search .................... 353/20, 353/30, 31, 33, 37, 38, 94, 97–99, 122; 362/227–228, 216–225, 217.01–217.17, 362/253–254, 260, 307–310, 257, 296.01, 362/317, 326–329, 23–30; 349/5, 7, 8, 9, 349/71, 69, 70; 348/742, 743, 744, 771; 359/290–292, 630, 631, 632, 633, 639, 640

See application file for complete search history.

(56) References Cited

U.S. PATENT DOCUMENTS

| | | | | |
|---|---|---|---|---|
| 6,104,446 | A * | 8/2000 | Blankenbecler et al. | 349/5 |
| 7,048,385 | B2 * | 5/2006 | Beeson et al. | 353/97 |
| 7,234,820 | B2 * | 6/2007 | Harbers et al. | 353/94 |
| 7,390,097 | B2 * | 6/2008 | Magarill | 353/94 |
| 7,959,321 | B2 * | 6/2011 | Ryu et al. | 362/231 |
| 8,096,668 | B2 * | 1/2012 | Abu-Ageel | 362/84 |
| 2003/0006469 | A1 * | 1/2003 | Ellens et al. | 257/432 |
| 2005/0128435 | A1 * | 6/2005 | Yamauchi et al. | 353/20 |
| 2006/0114423 | A1 * | 6/2006 | Maeda et al. | 353/94 |
| 2008/0252854 | A1 * | 10/2008 | Liao et al. | 353/31 |
| 2009/0268469 | A1 * | 10/2009 | Huang et al. | 362/308 |
| 2009/0303443 | A1 * | 12/2009 | Wachter | 353/20 |
| 2010/0321641 | A1 * | 12/2010 | Van Der Lubbe | 353/31 |

FOREIGN PATENT DOCUMENTS

CN   101520550 A   9/2009

* cited by examiner

*Primary Examiner* — Georgia Y Epps
*Assistant Examiner* — Sultan Chowdhury
(74) *Attorney, Agent, or Firm* — Altis Law Group, Inc.

(57) ABSTRACT

An optical system includes a light source array, a dichroic mirror set, a light converting device and a light guide pipe. The light source array is used for emitting a first homogeneous light. The dichroic mirror set is disposed in a light path of the first homogeneous light and used for reflecting a part of the first homogeneous light to the light guide pipe, transmitting the remaining part of the first homogeneous light to the converting device. The light converting device is disposed in the transmitting light path of the dichroic mirror and used for transferring the first homogeneous light into a second, third homogeneous light. The dichroic mirror is further used for reflecting the second, third homogeneous light to the light guide pipe. The light guide pipe is used for mixing the first, second and third homogeneous light to obtain a white light.

15 Claims, 2 Drawing Sheets

OPTICAL SYSTEM FOR PROJECTION DEVICE

BACKGROUND

1. Technical Field

The present disclosure relates to optical systems and, particularly, to an optical system for use in a projection device.

2. Description of Related Art

Currently, many projectors use light emitting diodes (LEDs) as light sources. To produce color images, three (or more) groups of different color LEDs and corresponding optical components are required, adding substantially to the size of the projectors. So, it becomes a challenge to miniaturize the projectors.

Therefore, it is desirable to provide an optical system for a projection device, which can overcome the above-mentioned limitations.

BRIEF DESCRIPTION OF THE DRAWINGS

Many aspects of the embodiments should be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Figure 1:
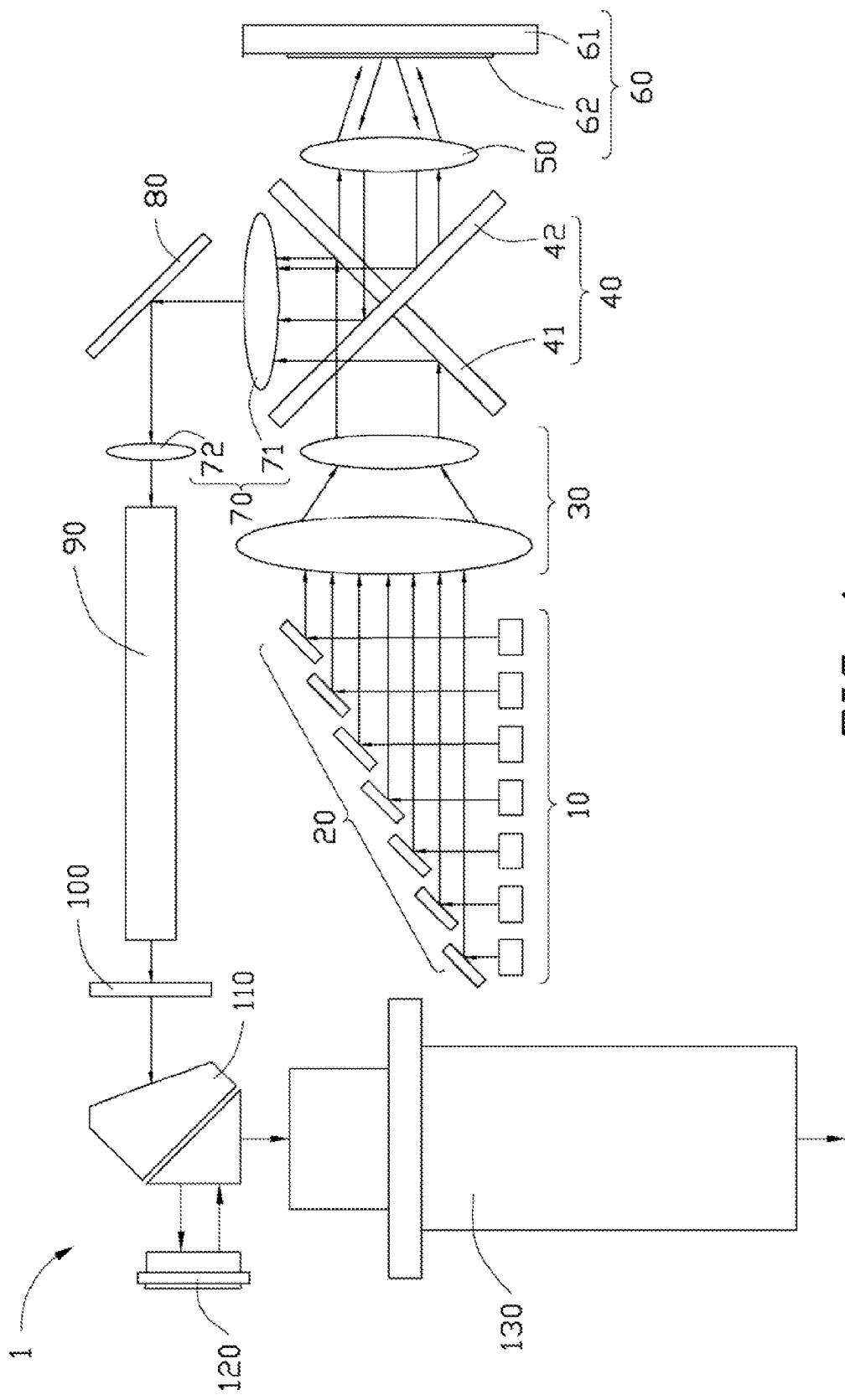
FIG. 1 is a schematic view of a first embodiment of an optical system, according to the disclosure.

Referring to FIG. 1, an optical system 1 according to a first embodiment includes a light source array 10, a reflector array 20, a condenser 30, a dichroic mirror set 40, a lens 50, a light converting device 60, an optical lens array 70, a reflector 80, a light guide pipe 90, a color wheel 100, a total internal reflection (TIR) prism 110, a digital micro-mirror device (DMD) 120, and a projection lens 130.

The light source array 10 is configured for generating a first homogeneous light. In this embodiment, the light source array 10 is a blue LED array. It can be understood that the light source array 10 also can be a laser diode (LD) array.

The reflector array 20 is disposed in the light path of the light source array 10 (i.e., the light path of the first homogeneous light) and configured for reflecting the first homogeneous light emitted by the light source array 10 to the condenser 30.

The condenser 30 is positioned in the light path of the first homogeneous light succeeded by the reflector 20 and transmits the first homogeneous light to the dichroic mirror set 40.

The dichroic mirror set 40 selectively reflects a portion (spectrum) of light and transmits a remaining portion of light (a remaining spectrum). The dichroic mirror set 40 includes a first dichroic mirror 41 and a second dichroic mirror 42 intersecting the first dichroic mirror 41 transversely. The first dichroic mirror 41 inclines to the lens 50. The second dichroic mirror 42 inclines to the condenser 30. In the present embodiment, the first dichroic mirror 41 has a reflective coating which can reflect 10% of the first homogeneous light, and transmit 90% of the first homogeneous light. The second dichroic mirror 42 has a reflective coating which can transmit 100% of the first homogeneous light. Alternatively, the first and second dichroic mirrors 41, 42 can be coated with other reflective coatings depending on types of the light sources.

The lens 50 is disposed in the transmitting light path of the dichroic mirror set 40 and is configured for gathering the first homogeneous light from the dichroic mirror set 40.

The light converting device 60 is configured for converting the first homogeneous light into a second homogeneous light and a third homogeneous light, and reflecting the second and third homogeneous lights to the dichroic mirror set 40 through the lens 50. The first, second, and third homogeneous lights is complementary. The light converting device 60 includes an opaque base 61 and a phosphor 62 coated on the opaque base 61. In the present embodiment, the phosphor 62 is made of $Y_3Al_5O_{12}Ce$ and configured for converting the blue light to a red light and a green light. The lens 50 is also configured for collimating the second homogeneous light from the light converting device 60 as a parallel light. The first dichromic mirror 41 is configured for passing 100% of the second and third homogeneous lights from the light converting device 60. The second dichromic mirror 42 is configured for reflecting 100% of the second and third homogeneous lights from the light converting device 60.

The optical lens array 70 includes a first optical lens 71 and a second optical lens 72 formed perpendicular to the first optical lens 71. The optical lens array 70 is configured for condensing the light from the dichroic mirror set 40 and the light converting device 60.

The reflector 80 is inclined between the first optical lens 71 and the second optical lens 72 and is configured for reflecting the light from the first optical lens 71 to the second optical lens 72.

The light guide pipe 90 is configured for mixing the first homogeneous light and the second homogeneous light to a white light and projecting the white light to the color wheel 100.

The color wheel 100 is configured for dispersing the white light into sequential a red light, a green light and a blue light.

The TIR prism 110 includes two triangular prisms disposed in such a way that a hypotenuse surface thereof, with a gap formed therebetween, and is configured to change the light path.

The DMD 120 is configured for modulated light incident thereon into images based upon video signal input thereto.

The projection lens 130 includes an entrance through which light is received and thereby projects the optical images on a screen (not shown).

Alternatively, in other embodiments, the light source array 10 can be a red LED array, and the phosphor is $MGa_2S_4$ which is configured for converting the red light into a green light and a blue light. The light source array 10 also can be a green LED array. Correspondingly, the phosphor is $Ca(PO_4)_5Cl_2$ which is configured for converting the green light into a red light and a blue light.

Figure 2:
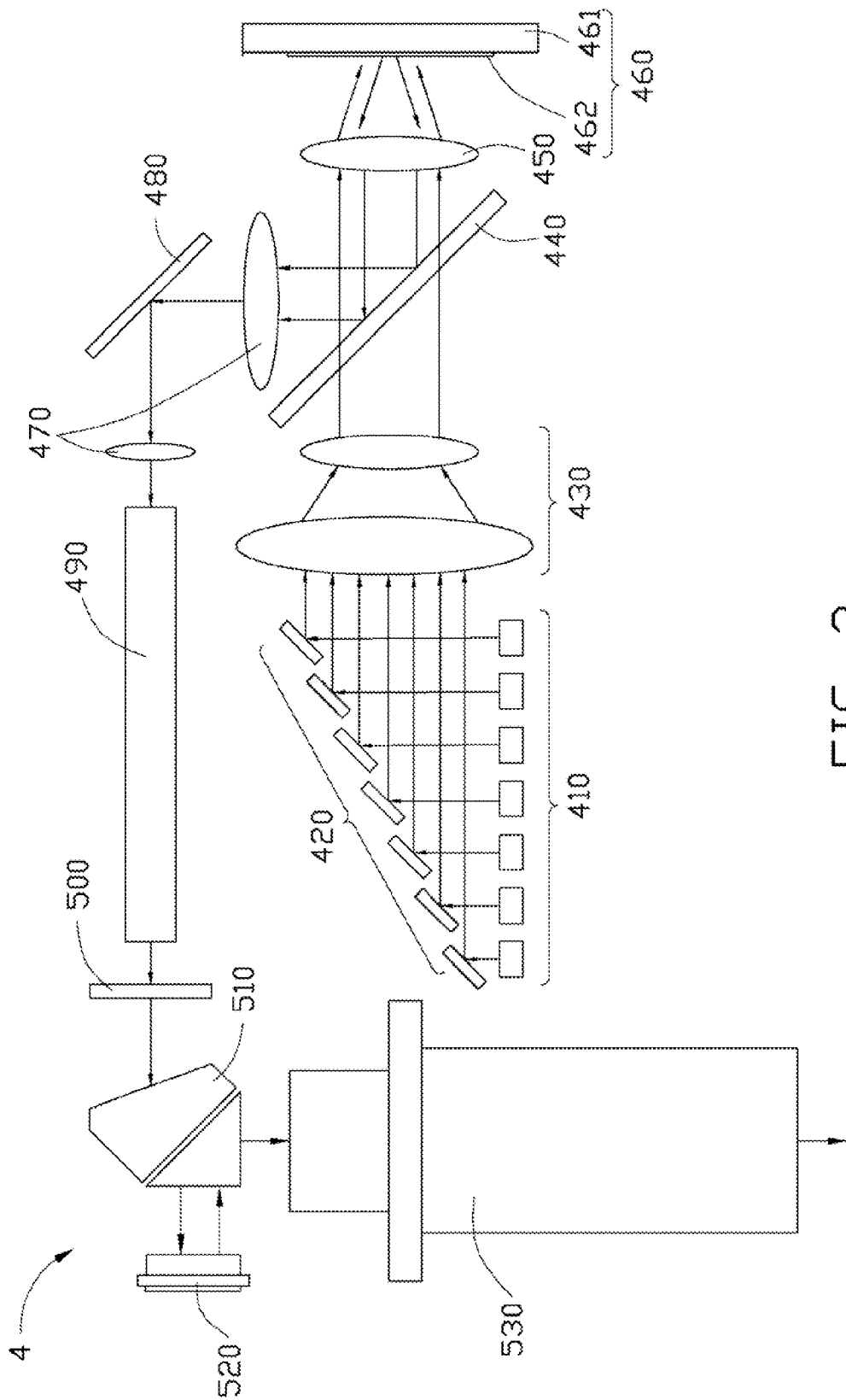
FIG. 2 is a schematic view of a second embodiment of an optical system, according to the disclosure.

Referring to FIG. 2, a second embodiment of an optical system 4 is shown. The optical system 4 includes a light source array 410, a reflector array 420, a condenser 430, a dichroic mirror set 440, a lens 450, a light converting device 460, an optical lens array 470, a reflector 480, a light guide pipe 490, a color wheel 500, a total internal reflection (TIR) prism 510, a digital micro-mirror device (DMD) 520, and a projection lens 530 along the light path. The differences between the optical system 4 of the second embodiment and the optical system 1 of the first embodiment are: the light source array 410 emits a UV (ultraviolet) light. The phosphor 462 is RGB phosphor which is configured for converting the UV light into a white light. The dichroic mirror set 440 only includes a dichroic mirror which can transmit 100% of the UV light from the light source array 410 and reflect 100% of the white light from the phosphor 462.

It will be understood that the above particular embodiments and methods are shown and described by way of illustration only. The principles and the features of the present disclosure may be employed in various and numerous embodiments thereof without departing from the scope of the disclosure as claimed. The above-described embodiments illustrate the scope of the disclosure but do not restrict the scope of the disclosure.

What is claimed is:

1. An optical system comprising:
   a light source array configured for emitting only one kind of first homogeneous light along a particular direction;
   a dichroic mirror set consisting of a first dichroic mirror and a second dichroic mirror intersecting the first dichroic mirror transversely, disposed in a light path of the first homogeneous light and configured for transmitting a portion of the first homogeneous light and reflecting a remaining portion of the first homogeneous light;
   a light converting device disposed in a transmitting light path of the dichroic mirror set and configured for converting the first homogeneous light into a second homogeneous light and a third homogeneous light and then reflecting the second homogeneous light and the third homogeneous light into the dichroic mirror set; the first, second, and third homogeneous lights being different and complementary;
   the dichroic mirror set also configured for reflecting the second homogeneous light and the third homogeneous light; and
   a light guiding pipe disposed in the reflecting light path of the dichroic mirror set and configured for mixing the first, second, and third homogeneous lights into a white light.

2. The optical system in claim 1, wherein the light converting device comprises an opaque base and a phosphor coated on the opaque base.

3. The optical system in claim 2, wherein the first homogeneous light is a blue light and the phosphor is configured for converting the blue light to a red light and a green light.

4. The optical system in claim 2, wherein the first homogeneous light is a red light and the phosphor is configured for converting the red light into a green light and a blue light.

5. The optical system in claim 2, wherein the first homogeneous light is a green light and the phosphor is configured for converting the green light into a red light and a blue light.

6. The optical system in claim 1, wherein the light source array is LED array or LD array.

7. An optical system comprising:
   a light source array configured for emitting only one kind of first homogeneous light along a particular direction;
   a dichroic mirror set consisting of only one dichroic mirror, disposed in a light path of the first homogeneous light and configured for transmitting the first homogeneous light; and
   a light converting device disposed in a transmitting light path of the dichroic mirror set and configured for converting the first homogeneous light into a white light and then reflecting the white light into the dichroic mirror set;
   the dichroic mirror set also configured for reflecting the white light.

8. The optical system in claim 7, wherein the first homogeneous light is UV light.

9. The optical system in claim 7, wherein the light source array is LED array or LD array.

10. A projection device comprising:
    An optical system comprising:
    a light source array configured for emitting only one kind of first homogeneous light along a particular direction;
    a dichroic mirror set being a first dichroic mirror and a second dichroic mirror intersecting the first dichroic mirror transversely, disposed in a light path of the first homogeneous light and configured for transmitting a portion of the first homogeneous light and reflecting a remaining portion of the first homogeneous light;
    a light converting device disposed in a transmitting light path of the dichroic mirror set and configured for converting the first homogeneous light into a second homogeneous light and a third homogeneous light and then reflecting the second homogeneous light and the third homogeneous light into the dichroic mirror set; the first, second, and third homogeneous lights being different and complementary;
    the dichroic mirror set also configured for reflecting the second homogeneous light and the third homogeneous light; and
    a light guiding pipe disposed in the reflecting light path of the dichroic mirror set and configured for mixing the first, second, and third homogeneous lights into a white light.

11. The projection device in claim 10, wherein the light converting device comprises an opaque base and a phosphor coated on the opaque base.

12. The projection device in claim 11, wherein the first homogeneous light is a blue light and the phosphor is configured for converting the blue light to a red light and a green light.

13. The projection device in claim 11, wherein the first homogeneous light is a red light and the phosphor is configured for converting the red light into a green light and a blue light.

14. The projection device in claim 11, wherein the first homogeneous light is a green light and the phosphor is configured for converting the green light into a red light and a blue light.

15. The projection device in claim 10, wherein the light source array is LED array or LD array.

\* \* \* \* \*